United States Patent Office 2,941,007
Patented June 14, 1960

2,941,007

PROCESS FOR THE OXIDATION OF OLEFINS

James L. Callahan, Bedford, Robert W. Foreman, Cleveland, and Franklin Veatch, Lyndhurst, Ohio, assignors to Standard Oil Company, Cleveland, Ohio, a corporation of Ohio No Drawing. Filed June 10, 1957, Ser. No. 664,495

6 Claims. (Cl. 260—604)

The present invention relates to a process for the catalytic oxidation of olefins to useful oxygenated hydrocarbon compounds. More particularly, this invention involves a process for the production of unsaturated aldehydes and ketones containing an olefinic linkage between two carbon atoms of aliphatic character, one of which is directly linked to the aldehyde or ketone carbonyl group. The process has special application to the production of acrolein and methacrolein from propylene and isobutylene, respectively.

The process of this invention is executed by contacting in the vapor phase a gaseous mixture comprising an olefin and oxygen with a solid catalyst essentially comprising a compound of the elements bismuth and molybdenum. In one embodiment of this invention, we have discovered that the element phosphorous may be included in the catalyst with advantage. The catalyst may be used alone or on a support which is preferably silica. An elevated temperature is employed and a substantial amount of the olefin is oxidized to an oxygenated hydrocarbon containing the same or a lesser number of carbon atoms per molecule as the olefin. It has also been found that water may be included in the reaction mixture with beneficial effects on the course of this reaction.

THE OLEFINS AND THEIR OXIDATION PRODUCTS

By the term "olefin" as used herein and in the appended claims is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methyl-butene-1, 2-methyl-butene-2, hexene-1, hexene-2, 4-methyl pentene-1, 3,3-dimethyl-butene-1, 4-methyl-pentene-2, octene-1, cyclopentene, cyclohexene, 3-methyl-cyclohexene, etc. This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or hetero-cyclic radicals. The process of the invention is applicable to individual olefins as well as to mixtures of olefins and also to mixtures of olefins with the corresponding or other saturated organic compounds.

The process of this invention is particularly adapted to the conversion of propylene to acrolein, isobutylene to methacrolein, alpha- or beta-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

Straight-chain alpha-olefins of three or more carbon atoms, when oxidized according to the process of the invention, tend to yield the same products as the corresponding beta-olefins. Thus, as stated above, alpha-butylene, as well as beta-butylene, yields methyl vinyl ketone; and pentene-1, like pentene-2, yields ethyl vinyl ketone. It is believed that this results from isomerization of the alpha-olefins to the beta-olefins under the reaction conditions.

It is surprising that the vinyl type carbonylic products obtained by the process of this invention are not always those which would be expected from the direct substitution of an oxygen atom for two hydrogen atoms in the allyl position, i.e., for two hydrogen atoms attached to a carbon atom separated from the double bond by an intervening carbon atom. For in the latter case beta butylene would form crotonaldehyde and not methyl vinyl ketone. Instead, the reaction appears to be initiated at the double bond and proceeds with the elimination of a hydrogen atom in the allyl position and a change in position of the double bond.

The olefins may be in admixture with other hydrocarbons, for example, a propylene-propane mixture may constitute the feed. It is an advantage of our process that the propane is not readily oxidized and passes through the reaction largely as an inert diluent. This makes it possible to use ordinary refinery streams without special preparation.

THE CATALYST

The catalyst which is employed in the process of this invention must include bismuth and molybdenum, generally in combination with oxygen so that it may be regarded as a bismuth molybdate, and it may include other additional elements, e.g., phosphorous. In one embodiment of this invention the catalyst comprises bismuth, phosphorous, and molybdenum, which may be regarded as a bismuth phosphomolybdate; however, catalysts which contain no phosphorous are useful in this process and are contemplated within the scope of this invention.

The catalyst may be prepared by reacting in solution appropriate quantities of any available bismuth salt such as bismuth nitrate with molybdic acid or phosphomolybdic acid. In the case where bismuth phosphomolybdate acid is to be employed the free phosphomolybdic acid may be prepared in any number of ways which are well known to those skilled in the art; for example, (1) by mixing appropriate quantities of phosphoric and molybdic acid; (2) by double decomposition of the appropriate salts; (3) by extraction with ether from acidified aqueous solutions of the appropriate salts; (4) by ion exchange from phosphomolybdate salts.

The catalyst of this invention may be conveniently represented by the following empirical formula:

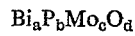

$$Bi_aP_bMo_cO_d$$

where $a$ may be 0.5 to 18, $b$ may be 0 to 5, $c$ is 12, and $d$ is 36 to 76 when the other elements are in their fully oxidized state and the amount of oxygen will be reduced correspondingly when the elements are in the lower valence state. A preferred catalyst is one in which $a$ is in the range from 6 to 12 and the optimum appears to be about 9. It is to be understood that phosphorous need not be present in this catalyst as disclosed herein. When $b=0$ the compounds is a bismuth molybdate as this term is used herein; when $b$ is not 0 the compound is a bismuth phosphomolybdate as this term is used herein.

In the case where the bismuth phosphomolybdate or molybdate is to be employed with a support such as silica, it is generally preferable to have the bismuth present in excess of the theoretical quantity necessary to form the true salt since the additional bismuth has a beneficial effect on the physical properties of the catalyst and reference to bismuth phosphomolybdate herein is intended to include compounds with such an excess of bismuth.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as alundum, silicon carbide, alumina-silica, alumina, titania and other chemically inert materials may be employed as a support which will withstand the conditions of the process.

The catalyst may be prepared by any of the numerous methods of catalyst preparation which are known to those skilled in the art. In one method of manufacture the catalyst is prepared by co-gelling the various ingredients. The co-gelled mass is then dried and ground to an appropriate size. Alternately, the co-gelled material may be slurried and spray-dried. It may be extruded as pellets or formed into spheres in oil as well known in the art. Alternatively, the catalytic components may be mixed with the support in the form of a slurry or may be impregnated on silica particles or other support. The method of preparation is not critical and the preferred method is that shown in the examples hereinafter.

The surface area of the catalyst is relatively important and we have found that catalysts having unusually high surface areas exert a deleterious effect on the course of the reaction in that they favor substantially complete oxidation of the olefin. In general, the surface area of the catalyst should not exceed 500 sq. meters per gram, but there is no lower limit on surface area save that imposed by the natural geometry of the catalyst particles.

In some cases, it may be desirable to heat treat the catalyst after preparation for the purpose of modifying the surface area or for the purpose of driving off those volatile ingredients which are included in the catalyst during preparation but which are unnecessary to its operability. The catalyst may be prepared in any convenient form; as for example, pellets or in small particles suitable for use in a so-called "fluidized" bed.

THE PROCESS CONDITIONS

The temperature at which the process of this invention is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g., temperatures in the range of 500 to 1000° F. may be advantageously employed. However, the process may be conducted at other pressures, and in the case where super atmospheric pressures, e.g., above 100 p.s.i.g., are employed somewhat lower temperatures are feasible. In the case where this process is employed to convert propylene to acrolein, a temperature range of 750 to 850° F. has been found to be optimum at atmospheric pressure.

The apparent contact time employed in the process is not especially critical and it may be selected from a broad operable range which may vary from 0.1 to 200 seconds. The apparent contact time may be defined as the length of time in seconds which the unit volume of gas measured under the conditions of reaction is in contact with the apparent unit volume of the catalyst. It may be calculated for example from the apparent volume of the catalyst bed, the average temperature and pressure of the reactor, and the flow rates of the several components of the reaction mixture. The optimum contact time will, of course, vary depending upon the olefin being treated, but in the case of propylene the preferred apparent contact time is 1 to 15 seconds.

A molar ratio of oxygen to olefin between about 5:1 to 0.5:1 generally gives the most satisfactory results. For the conversion of propylene to acrolein, a preferred ratio of oxygen to olefin is about 1:1. The oxygen used in the process may be derived from any source: however, air appears to be the least expensive source of oxygen and it is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of 1:1 to 1:10 will give very satisfactory results and a ratio of 1:3 to 1:5 has been found to be optimum when converting propylene to acrolein. The water, of course, will be in the vapor phase during the reaction.

Inert diluents such as nitrogen, carbon dioxide, and saturated hydrocarbons such as ethane, propane, and butane and pentane may be present in the reaction mixture; however, no beneficial effect on the reaction has been observed in the presence of such diluents. Processes are not contemplated in which diluents are present which would react to form compounds other than those consisting of the elements carbon, hydrogen and oxygen.

In general, any apparatus of the type suitable for carrying out oxidation reactions in the vapor phase may be employed for the execution of the process. It may be operated continuously or intermittently and may be a fixed bed with a pelleted catalyst. We prefer, however, to employ a reactor containing a so-called "fluidized" bed of catalyst for the reason that the temperature of the reaction must be closely controlled. It has been determined that without such temperature control the oxidation will proceed to the formation of carbon dioxide and water at the expense of the desired product. A "fluidized" catalyst bed simplifies the problem of temperature control since coils through which water or other heat transfer medium is circulated may be conveniently disposed in the bed to control the temperature.

As stated above, pressures other than atmospheric may be employed in this process but it is generally preferred to operate at or near atmospheric pressure since the reaction proceeds well at such pressures and the use of expensive high pressure equipment is avoided.

The reactor may be brought to the reaction temperature before or after the introduction of the vapors to be reacted. In large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a non-polar solvent, e.g., a hydrocarbon fraction, in order to recover unreacted olefin and in this case the remaining gases may be discarded. An inhibitor to prevent polymerization of the unsaturated products, as is well known in the art, may be added at any stage.

Various aspects of this invention are revealed by the following examples which illustrate the best mode we contemplate for carrying out the invention. The apparatus employed carrying out the runs described in these examples was a fluidized bed reactor. The reactor consisted of a 13 inch length of 1¾ inch stainless steel pipe. An internal filter was provided in the upper section to remove the entrained solids from the gases leaving the reactor. The catalyst section was heated with an electrical resistance wire wound about the outside of the pipe and temperature measurements within the reactor were obtained by thermocouples. The components of the reaction mixture were pre-mixed and introduced to the reactor through a single inlet tube. The effluent was treated by water scrubbing to recover the products and the amount of product was determined by conventional analytical methods.

Example I

A catalyst was prepared according to the following procedure:

A solution containing 170 g. of molybdic acid (85% $MoO_3$) and 150 cc. of water was added to 1330 g. of a solution of an aqueous colloidal silica sol containing 30% by weight of silica. Next, a solution containing 364 g. of $Bi(NO_3)_3 \cdot 5H_2O$, 200 milliliters of water, and 20 milliliters of $HNO_3$ was added to the silica solution. The resulting mixture was dried and then heated at 1000° F. for 16 hours. The catalyst was then ground and screened to 40–140 mesh.

Example IA 200 g. of the catalyst of Example I were placed in the above-described fluidized bed reactor. During the reaction, the reactor was maintained at a temperature of 800° F. and atmospheric pressure. At flow rates of 0.01 mols of propylene per minute, 0.056 mols of air per minute, and 0.039 mols of water (an apparent contact time of 3.1 seconds), it was found that 45% of the propylene was converted and the yield of acrolein was 73.1% based on the propylene converted. Small amounts of other oxygenated compounds including acetaldehyde, acetic acid, and acrylic acid, were formed in a yield of 10% based on propylene converted. The balance is carbon oxides and water.

Example II

Another catalyst was prepared according to the following procedure:

A solution containing 9.3 cc. of 85% phosphoric acid, 272 g. of molybdic acid (85% $MoO_3$), 40 cc. of nitric acid and 582 g. of $Bi(NO_3)_3 \cdot 5H_2O$ in 400 cc. of water was added to 750 g. of an aqueous solution of an aqueous colloidal silica sol containing 30% silica. The mixture was then dried at 1000° F. for 16 hours. Subsequently, it was ground and screened to 40–140 mesh.

Example IIA 200 g. of the catalyst of Example II were placed in the above-described reactor. The reactor was maintained at a temperature of 800° F. and atmospheric pressure throughout the run. At flow rates of 0.0107 mols of propylene per minute, 0.056 mols of air per minute, and 0.039 mols of water per minute (an apparent contact time of 3.1 seconds), it was found that 56.9% of the propylene was converted and that the yield of acrolein as 71.9% based on the propylene consumed. Small amounts of other oxygenated compounds, such as acetaldehyde, acetic acid and acrylic acid are also formed totalling 12.1% based on the propylene consumed. The balance is carbon oxides and water.

The following table shows that temperature is not critical over a relatively broad range:

| Temperature, °F. | Percent Conversion | Percent Yield of Acrolein |
|---|---|---|
| 650 | 19.5 | 53.0 |
| 700 | 32.6 | 60.7 |
| 750 | 50.6 | 58.5 |
| 800 | 54.1 | 54.7 |
| 950 | 41.8 | 47.5 |

In the above runs the catalyst was 44.8%

$$Bi_9PMo_{12}O_{52} - 55.2 SiO_2$$

and the amount of propylene fed to the above apparatus was 0.009 mols/min. and the amount of air was 0.056 mols/min. This data shows that the temperature may be varied over a broad range and that it can be selected in relation to the conversion and yield desired.

In this and the other examples the following definitions are employed:

Percent Conversion $$= \frac{\text{Weight of olefin in feed} - \text{weight of olefin in effluent}}{\text{Weight of olefin in feed}} \times 100$$

$$\text{Percent Yield} = \frac{\text{Weight of olefin converted to aldehyde or ketone}}{\text{Weight of olefin in feed} - \text{weight of olefin in effluent}} \times 100$$

The following table shows the effect of the ratio of oxygen to propylene and demonstrates that this is not critical within the limits disclosed:

| Propylene, Mols/min. | Air, Mols/min. | Percent Conversion | Percent Yield of Acrolein |
|---|---|---|---|
| 0.0046 | 0.056 | 33.2 | 67.8 |
| 0.0091 | 0.056 | 32.6 | 61.0 |
| 0.0156 | 0.056 | 26.9 | 61.8 |

The catalyst was that used in the previous table and the temperature was 700° F.

The following table shows that the ratio of catalyst to support is not critical but that a higher conversion and a higher yield is obtained by the use of a support:

| Composition | Percent Conversion | Percent Yield of Acrolein |
|---|---|---|
| 10% $Bi_9PMo_{12}O_{52}$ / 90% $SiO_2$ | 13.0 | 64.5 |
| 45% $Bi_9PMo_{12}O_{52}$ / 55% $SiO_2$ | 54.1 | 54.7 |
| 70% $Bi_9PMo_{12}O_{52}$ / 30% $SiO_2$ | 56.9 | 71.8 |
| 100% $Bi_9PMo_{12}O_{52}$ / 0% $SiO_2$ | 50.5 | 69.2 |

The above runs were carried out at a temperature of 800 to 850° F. with the same air and propylene ratio, i.e., 0.056 and 0.01 mols/min.

That the bismuth content is not critical within the range above disclosed is shown by the following data:

| Catalyst | Percent Conversion | Percent Yield of Acrolein |
|---|---|---|
| $BiPMo_{12}O_{40}$ | 9.8 | 55.2 |
| $Bi_6PMo_{12}O_{47.5}$ | 43.9 | 70.5 |
| $Bi_9PMo_{12}O_{52}$ | 54.1 | 54.8 |
| $Bi_{12}PMo_{12}O_{55.5}$ | 46.1 | 65.9 |

All of the runs were carried out at the same temperature and conditions as in the previous table and with the addition of 0.7 cc. of water/min. in the apparatus above defined. In each instance the catalyst was supported on about 50% SiO$_2$. While most of the data presented relates to bismuth phosphomolybdate, the same considerations apply to bismuth molybdate and equivalent results will be obtained.

The foregoing examples are intended merely as illustrations of this invention and are not to be construed as limitations upon the scope of the invention. Various modifications of the reaction conditions described will be readily apparent to those skilled in the art, but this application for Letters Patent is intended to include all such modifications as would reasonably fall within the scope of the appended claims.

We claim:

1. A process for the manufacture of unsaturated aldehydes comprising the step of contacting a gaseous mixture of a mono-olefin containing from 3 to 8 carbon atoms and oxygen with a catalyst comprising a compound selected from the group consisting of bismuth molybdate and bismuth phosphomolybdate at a temperature in the range of about 500 to 1000° F., said gaseous mixture having a ratio of oxygen to olefin in the range of 0.5:1 to 5:1.

2. A process for the manufacture of unsaturated aldehydes comprising the step of contacting a gaseous mixture of a mono-olefin containing from 3 to 8 carbon atoms and oxygen with a catalyst comprising a compound selected from the group consisting of bismuth molybdate and bismuth phosphomolybdate at a temperature in the range of about 500 to 1000° F., said gaseous mixture having a ratio of oxygen to olefin in the range of about 1:1.

3. A process for the manufacture of acrolein comprising the step of contacting a gaseous mixture of propylene and oxygen with a catalyst comprising a compound selected from the group consisting of bismuth molybdate and bismuth phosphomolybdate at a temperature in the range of 500 to 1000° F., said gaseous mixture having an oxygen to olefin ratio in the range of about 5:1 to 0:5.1.

4. A process for the manufacture of acrolein comprising the step of reacting in the vapor phase propylene with molecular oxygen in the presence of a catalyst comprising silica and a compound selected from the group consisting of bismuth molybdate and bismuth phosphomolybdate at a temperature in the range of about 750 to 850° F., and in which the feed to the process has a molar ratio of oxygen to propylene of about 1:1.

5. A process for the manufacture of acrolein comprising the step of contacting a gaseous mixture of propylene and molecular oxygen at a temperature in the range of 750 to 850° F. with a fixed bed of catalyst comprising silica and bismuth phosphomolybdate, said gaseous mixture having a ratio of oxygen to propylene of about 1:1.

6. A process for the manufacture of acrolein comprising the step of contacting a gaseous mixture of propylene and molecular oxygen at a temperature in the range of 750 to 850° F. with a fixed bed of catalyst comprising silica and bismuth molybdate, said gaseous mixture having a ratio of oxygen to propylene of about 1:1.

References Cited in the file of this patent

UNITED STATES PATENTS

| | | |
|---|---|---|
| 1,423,753 | Carter et al. | July 25, 1922 |
| 1,697,653 | James | Jan. 1, 1929 |
| 2,451,485 | Hearne et al. | Oct. 19, 1948 |
| 2,565,087 | Porter et al. | Aug. 21, 1951 |
| 2,606,933 | Cole et al. | Aug. 12, 1952 |
| 2,627,527 | Connolly et al. | Feb. 3, 1953 |
| 2,649,477 | Jacobs et al. | Aug. 18, 1953 |
| 2,659,746 | Morgan et al. | Nov. 17, 1953 |

FOREIGN PATENTS

| | | |
|---|---|---|
| 640,383 | Great Britain | July 19, 1950 |

UNITED STATES PATENT OFFICE
CERTIFICATE OF CORRECTION

Patent No. 2,941,007            June 14, 1960

James L. Callahan et al.

It is hereby certified that error appears in the printed specification of the above numbered patent requiring correction and that the said Letters Patent should read as corrected below.

Column 2, line 40, strike out "acid", first occurrence; line 59, for "compounds" read -- compound --; column 5, line 11, for "inventon" read -- invention --; line 73, for "as" read -- was --; column 6, line 14, strike out "44.8%" and insert the same before the formula in line 15, same column 6; column 8, line 3, for "0:5.1" read -- 0.5:1 --.

Signed and sealed this 10th day of January 1961.

(SEAL)
Attest:

KARL H. AXLINE            ROBERT C. WATSON
Attesting Officer            Commissioner of Patents